Oct. 29, 1957
F. HOTCHNER
2,810,973
DISPLAY DEVICES
Filed June 24, 1957
3 Sheets-Sheet 1
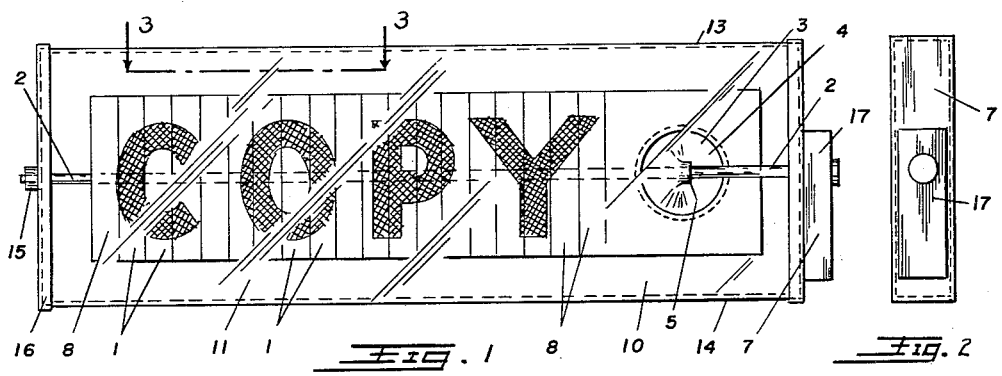
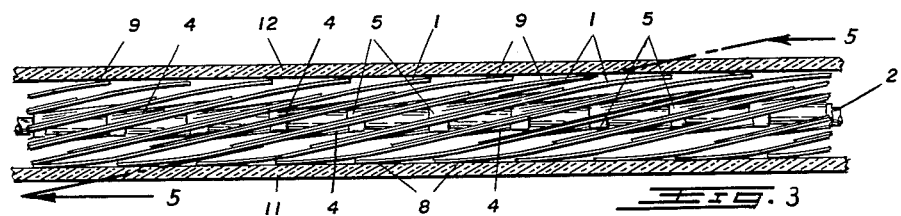
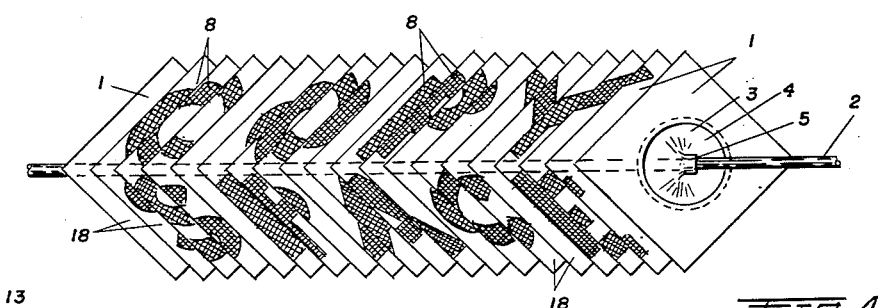
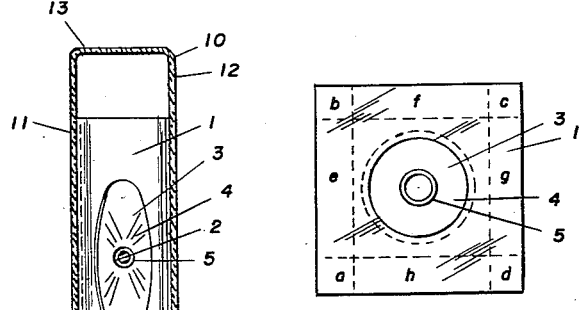
INVENTOR
Fred Hotchner
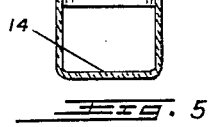

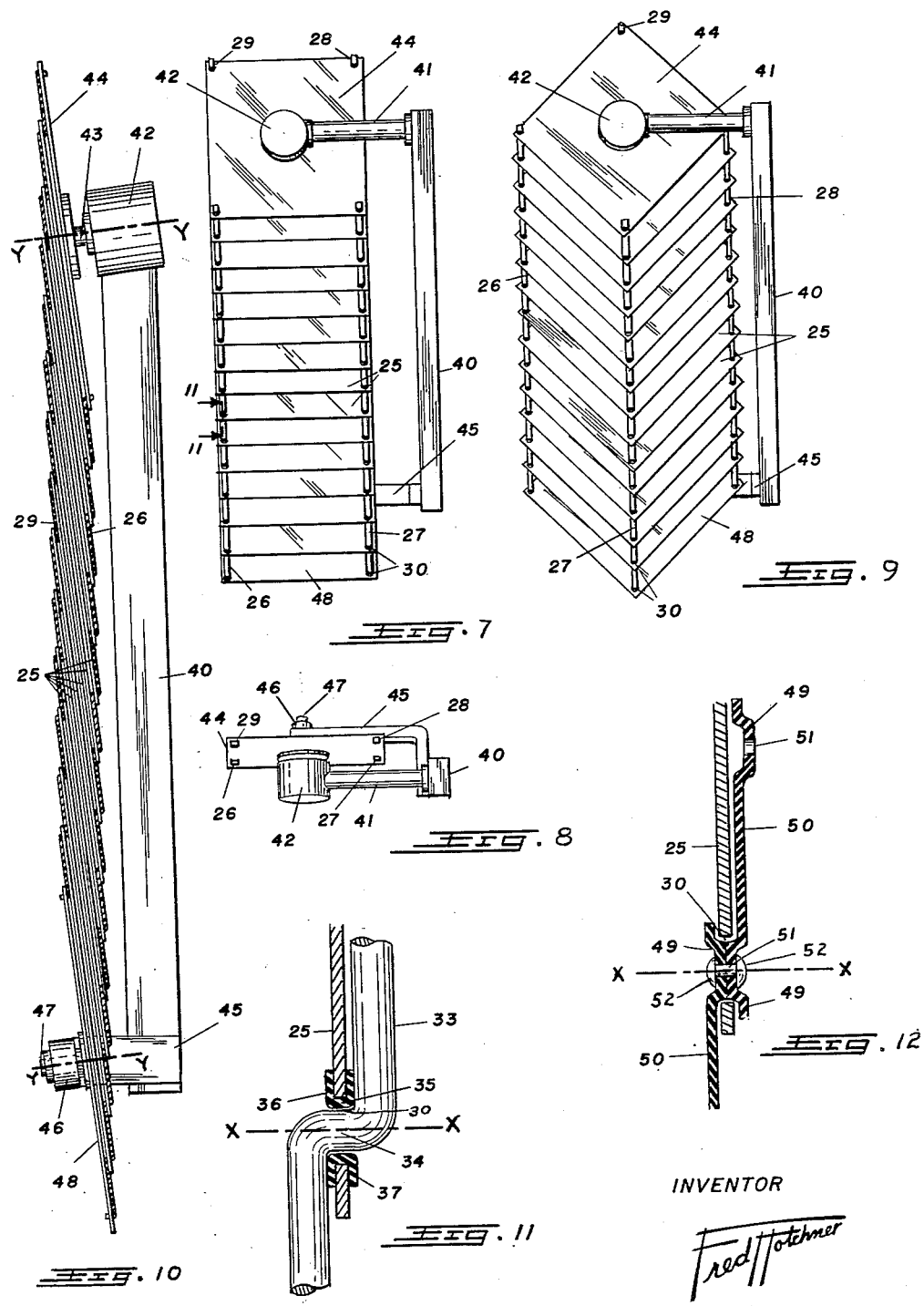

Oct. 29, 1957  F. HOTCHNER  2,810,973
DISPLAY DEVICES

Filed June 24, 1957  3 Sheets-Sheet 3

INVENTOR
Fred Hotchner

United States Patent Office 2,810,973
Patented Oct. 29, 1957

2,810,973

DISPLAY DEVICES

Fred Hotchner, San Pedro, Calif.

Application June 24, 1957, Serial No. 667,528

16 Claims. (Cl. 40—33)

This invention pertains to a changeable display device adapted to exhibit repeatedly in a given sequence, a plurality of display showings, which showings appear to view on and disappear from a display surface in a manner such as to mystify the observer and arouse favorable interest in the subject matter thus presented.

An object of the invention is to produce devices of the character hereof which will be relatively simple in construction, compact and attractive in appearance, and reliable in service.

In its generic aspect, the invention is capable of various embodiments. It is illustrated herein in three preferred species, according to each of which species, a display device may be constructed to exhibit changeable showings on one or on two sides of the structure.

The device of this invention comprises essentially: A plurality of plates of sheet material assembled in a staggered stack order such that a like positioned edge area of each of the plates is exposed to view to aggregate in a continuous surface bearing a display showing, in the case of a single sided display device, to one direction from which it is viewed, or in the case of a double sided device, to each of two opposite directions from which it may be viewed, together with means to rotate the plates, each in its own plane, in such manner as to variously expose different edge areas of the plates to view to present different display showings.

The three species of the invention differ from each other mainly in the combination of parts and mode of operation whereby the plates are supported and moved to accomplish this desired end.

In the first illustrated and described species, the plates are positioned along and flexibly mounted to a drive shaft, and restrained to movement, each along one of a plurality of parallel planes, facing in the general direction of one field of view in the case of a single sided display device, or in the case of a double sided device, facing in two opposite directions from which the device may be viewed.

In the second species, the plates are held in their given order and moved, each in its own plane, by means of tension members which extend along the edges of the stack of plates, making flexible connection to the plates such as to retain them in their relative spacing while permitting rotation of the tension members relative to the plates at the connecting points such as required by the geometric characteristics of the device.

In the third species, the plates are supported and moved by means of connecting members which pass through the plates in positions such as to be concealed from view from either side of the device.

Each species of the invention is marked by certain characteristics which render it preferable for certain commercial applications, whereby various objects may be served in the construction of display devices according to one or the other of the disclosed species, or in any combination of the various features of the several species shown and described. The features and characteristics of the invention in its several species, and the objects served in the construction of devices employing the same will be more fully described below.

The invention is shown in its preferred embodiments in each of three species in the accompanying drawings. It is to be understood that certain features of the invention which are shown in connection with a single species may, when applicable, be used in the construction of devices made according to any other species.

In the drawings:

Figures 1 through 6 are illustrative of the invention in its first described species. Figures 7 through 12 illustrate it in the second species. Figures 13 through 15 illustrate it in the third species.

Figure 1 is an elevation of a display device having a plurality of plates mounted along a drive shaft positioned within a sign body of transparent plastic material. Figure 2 is an end view of the same.

Figure 3 is a sectional view of the same, on an enlarged scale, taken as indicated by the section line 3—3 in Figure 1, showing the assemblage of shaft, plates and sign body, and illustrating the manner in which the plates are restricted to motion along planes facing the direction of view from either side of the sign.

Figure 4 is an elevation of the assemblage of shaft and plates, as seen from the normal direction of view from either side of the device, illustrative of the manner in which copy changes are effected by the simultaneous rotation of all of the plates, each in its own plane.

Figure 5 is a sectional view of the device taken as indicated by the section line 5—5 in Figure 3.

Figure 6 is an elevation of one of the faces of one of the plates, illustrative of the distribution of areas thereof for the reception of markings contributing to the copy aggregated with markings on the other plates in each of the several showings.

Figure 7 is an elevation of a vertical sign, as seen from one of two opposite directions of view, constructed according to the second species. The plates are shown in position to exhibit a display showing. In Figure 9 the sign is shown with the plates in a position intermediate between two showing positions.

Figure 8 is a plan view of the sign.

Figure 10 is an elevation of the left side of the sign, on an enlarged scale, illustrating the stacking of the plates to expose edge areas in the aggregation of display surfaces.

Figure 11 is a cross section, on a still further enlarged scale, along a vertical plane through one of the tension members, as indicated by the section line 11—11 in Figure 7.

Figure 12 is a cross section, similarly taken, of a modification of the detail illustrated in Figure 11.

Figure 13:
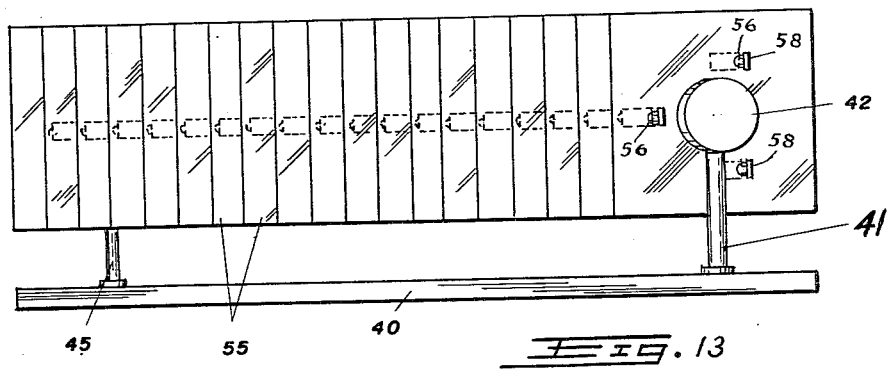

Figure 13 is an elevation of a sign, constructed according to the third species, as seen from a position in the normal field of view of one side thereof, with the plates in position of display registry.

Figure 14:
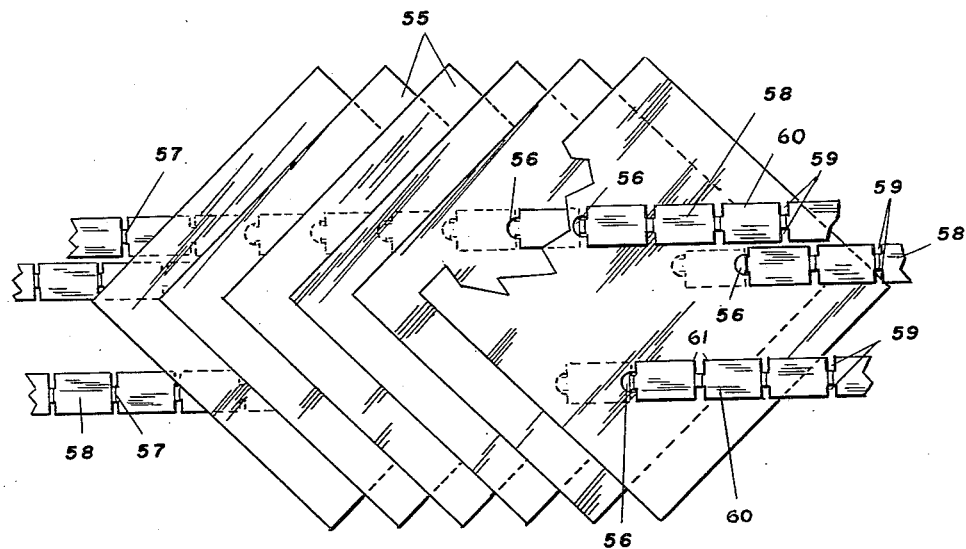

Figure 14 is a fragmented view of a portion of the assemblage of plates and supporting strips of the device of Figure 13, on an enlarged scale, with the plates shown in position intermediate between two showing positions.

Figure 15:
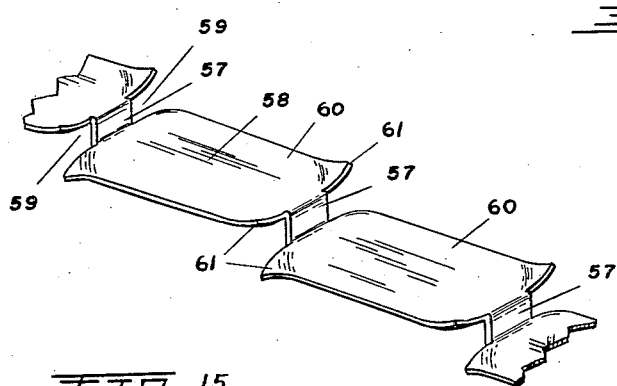

Figure 15 is a perspective view of a section of one of the supporting strips illustrative of the conformation of the strip in the assemblage.

In the drawings, the same reference numeral appearing in several views is used to indicate the same or the equivalent part throughout.

In my invention, a plurality of plates of sheet material, preferably like in size and shape, are assembled in a staggered stack order in which each plate is positioned along one of a plurality of parallel, closely spaced planes, with a like positioned edge area of each of the plates exposed to view, and with the remaining surface of each of the plates, excepting the first plate to view, concealed behind the next forward plate. The edge areas thus exposed aggregate in a continuous display surface showing to each side of the stack, for the reception of markings delineative of decorative designs or other graphic showings.

By the simultaneous rotation of the plates, each along its own plane, around a central point, like positioned on all of the plates, the edge areas exposed to view from each side of the device in one stage of the operation are traversed out of sight into the stack to be replaced by another set of edge areas which aggregated in another display showing to each side of the stack. Markings delineative of several display showings may thus be carried by one set of plates, showing in two directions.

The device may be constructed to exhibit several distinct display showings to each direction of view by providing markings, certain of which come into registration at each of several points of rotation in distinct designs. Alternately, a continuous symbolic or fanciful animation effect may be produced by providing markings which combine and change in relationship over the display surface as the plates are rotated.

The plates are preferably like in size and shape although this is not a limiting feature of the device. Deviations in size and shape between the plates of an individual device may be practiced for certain ends. The plates may be given various shapes, such as round, triangular or square, or of any other special shape, but I have found that plates in the square shape, carrying markings for four showings to each direction of view, make for the most practicable construction of the device and most satisfactory utilization of available plate surface.

As will be more fully explained below, a certain overlapping of corner areas occurs between successive showings, whereby certain plate edge areas of the border regions of the aggregated surfaces are exposed in two showings. Hence, such portions of the edge areas are restricted to being left unmarked, or to carrying markings which are compatible to both showings in which they are exposed.

The device of my invention in the species shown in Figures 1 through 6 includes an assemblage of plates along a shaft to which they are attached by means which permit the plates to be bent backward to lie along closely spaced parallel planes, and transmit driving torque from shaft to plates, in such positions, whereby the plates may be thus rotated along their respective planes to expose edge areas in the copy change or animation action herein described. The plates are retained in this folded-back condition by slide means which permit their movement in rotation along their respective planes.

In the construction shown, the retaining means consists of the side walls of a transparent sign body in which the assemblage is positioned, with end caps providing the bearing supports and driving attachment to rotate the shaft. Various other constructions may obviously be employed alternative to that here shown.

In Figures 1 through 6, the plates, indicated by reference numeral 1, 1, etc., having central openings 3, are spaced along the shaft 2 which extends through the openings, and are secured thereto against rotary displacement by the diaphragms 4 having integral collars 5 by means of which they are cemented to the shaft. The diaphragms are sufficiently flexible to permit the plates to be turned backward nearly parallel to the shaft, but sufficiently resistant to rotary twisting to effectively drive the plates in their turned-back positions as shown in Figure 3.

The assemblage of plates and shaft is positioned within the sign body 10, of transparent plastic material, which body is tubular and rectangular in form, with the plates bearing against the inside surfaces of the side walls 11 and 12, through which the display showings are exhibited, as seen in Figure 1. The end cap 16, closing one end of the body, carries the journal 15 to support one end of the shaft. The opposite end of the body is closed by the end cap 7 carrying the driving mechanism within the cover 17 to receive and drive the other end of the shaft. The upper and lower walls 13 and 14 of the body are spaced from the shaft a distance sufficient to permit free passage of the corners of the plates as they pass through the positions shown in Figure 4 during copy change actions.

The edge areas 8, 8, etc., of the plates aggregate in a display surface bearing markings which come into registration with each other when the plates are in the position shown in Figure 1 and are exposed to view through the wall 11. The edge areas 9, 9, etc., on the opposite sides of the plates similarly present copy matter to view in the opposite direction through the wall 12, as will be noted in Figure 3.

It will be seen in Figure 3 that the shaft is concealed from view from both sides of the device by the plates, except for the end runs from plates to bearings, which portions may optionally be concealed by opacities on the sign walls. The edge areas of the first plate to view, on the right hand end of the stack as seen in Figure 1 may be employed in the copy presentation by providing opacities on the sign faces to conceal all but the left edge area of that plate from view.

Referring now to Figure 6, it is noted that each edge area which becomes exposed in its turn to view in the showings includes two of the corners "a," "b," "c" and "d," and one of the rectangular strips "e," "f," "g" and "h." Each corner is thus common to two showings and therefore must be restricted against the bearing of any markings which are characteristic of single showings. These corners compose the upper and bottom strip areas of the aggregated display surfaces, and should be treated as back ground areas in any manner appropriate to such purpose.

In Figure 1 the plates are shown in position with top and bottom edges in alignment and with the plate markings in registration in a message. Preferably, the drive mechanism should be a four-stop intermittent movement which holds the plates in each such position for a short period before turning to the next showing.

In Figure 4, the plates are shown in positions intermediate between two positions of registration, in the change from one showing to the next. It is seen that the edge areas, bearing the markings, move upward, are tilted to the right and narrowed as they disappear into the stack, while the edge areas 18, bearing the markings of a succeeding showing, appear below from within the stack in opposite order, thus presenting an interesting and attractive action to command public attention.

In the second and third species of the invention, the plates are spaced from each other and driven by means of tension or spacing members making connection with the plates around the edges or through openings spaced from the plate centers, and lie normally along parallel closely spaced planes without the requirement of means to retain them in such positions. As the stack of plates in itself presents a neat and compact appearance, and as the plates in action present an interesting effect when fully exposed to view, the enclosing sign body may be dispensed with for many commercial purposes.

The stack may therefore be mounted from a stud shaft extending along an axial line perpendicular to each of the end plates at a like point of rotation thereon, said shafts extending through journals held by a suitable frame support, the stack being and driven from either end.

In Figures 7 through 12, I have shown a display device in which the stack of plates is exposed to view, supported and driven at one end by a motor and supported at the other end by a journal receiving a stud shaft; motor and journal being mounted to a simple wall frame. The invention in this embodiment may be constructed as a horizontal sign, but has particular advantage in the vertical disposition of plates as shown, in that the weight of the plates serves to retain the stack in alignment for considerable length of display showing.

As in the case of the first species, above described, the plates may take various shapes, but the square is found to be the most practicable in production design and most satisfactory in the disposition of display space available. I have shown the display with four spacing members, not as a necessary limitation, but in consideration of practical factors in manufacture and from the point of appearance.

The device may be constructed to operate satisfactorily with three spacing members, if driven from one end. If the stack be driven from both ends, it will operate with two spacing members.

In Figures 7, 9 and 10, each of the plates, 25, 25, etc., is connected to each other and maintained at a uniform spacing from each other in the stack arrangement shown by means of the spacing members 26, 27, 28 and 29. These members may be cables, rods or cords, or in any other suitable form, such as to pass through the openings 30 in the corners of the plates, maintain the plates in their proper spacing from each other, and turn freely around axial lines perpendicular to the plates at the openings 30, such as indicated by X—X in Figure 11, as the plates are rotated.

The stack is operated by means of the motor 42 which drives the top plate 44 of the stack through the stud shaft 43. For some purposes, the stack may be permitted to hang of its own weight without bottom support. In this illustration, however, I have shown the stack provided with bottom placement in the form of the journal 46 which receives the stud shaft 47 extending from the lower plate 48 of the stack. The stud shafts are perpendicular to the respective end plates along the axial lines Y—Y, intersecting rotating points in like location on both end plates.

The motor 42 is supported by the arm 41 from the wall frame member 40. The journal 46 is likewise supported from the wall frame by the arm 45.

In Figure 7, the stack is shown in a position of copy registration. In Figure 9, it is shown in a position intermediate two showing positions. It is to be noted that at no time in the operation do the spacing members interfere with the display showing, or with the motor or bottom support elements.

In Figure 11 is shown a satisfactory detail of the spacing member at a point where it passes through an opening in one of the plate corners, taken as indicated by the section line 11—11 in Figure 7. Grommets of anti-friction material, such as nylon, are inserted in the openings, as indicated by 35. The spacing rods 33 are formed with right angled offsets at each bearing point, as indicated by 34, passing through the grommets. The grommet flanges 36 and 37 provide a spacing between the runs of the spacing members and the surfaces of the plates to protect the plate finishes from scratching.

An alternative detail is shown in Figure 12. In this construction, strips 50 of sheet material, such as nylon are formed with oppositely protruding embossments 49 at the ends thereof. The depth of the embossments is such that the embossments of two strips, meeting through one of the holes 30 through a plate, meet with sufficient clearance between the two sides of the plates and the strips to afford free running of the device. The meeting embossments may be spot welded to each other, or riveted through the holes 51 as shown with the heads of the rivets 52 below the outer surfaces of the strips to avoid scratching the plate finishes.

The invention in its third species, exemplified by the device shown in Figures 13 through 15, provides for the concealment of the driving strips in an assemblage of plates and strips which is flat and compact, presents a neat appearance, and mystifies the observer as to the means whereby the plates are actuated.

In this embodiment, the plates are spaced and driven by means of flat strips of material, such as nylon sheet stock, which pass through openings in the plates spaced at such distances from the plate edges as to be out of sight at all times from either side of the display. As these strips may be of material width, they may be treated as horizontal sustaining members to retain a long series of plates in horizontal order against gravity. The invention in this form, therefore, has merits as a horizontal sign.

In other respects it is similar to the invention in its second species as shown in Figures 7 through 12 and described above.

As shown in Figure 14, each of the plates 55 is provided with a plurality of openings 56 through which extend the spacing members 58. These members are notched along the edges at 59, 59, etc., to leave narrowed connecting strips 57 between the spacing runs 60. The members are offset at the connecting strips to pass perpendicular through the plate holes whereby the strips 57 act as shafts turning through the plates. The corners 61 of the spacing runs 60 are preferably formed to turn away from the contacting surfaces of the plates to provide smooth running and avoid binding on the edges.

The openings 56 through the plates are spaced backward from the plate edges at such distances that no part of any of the spacing strips is exposed at any position of the plates from either side of the device. Three strips are sufficient for most purposes in this construction. Four or more strips may be used if found advantageous. The device will operate with two connecting strips if the stack be driven synchronously from both ends.

In the terminology of the claims, the term "connecting member" is to be understood as embracing a unitary member or any aggregation of elements equivalent thereto or serving as specified in the assemblage.

In the description in the claims of the manner in which the display showings are presented to view, the "points of rotation" at which "certain of the markings come into registration with each other to present a graphic display showing" may be infinite in number in which case the action is continuous in the presentation of such subject matter as symbolic or decorative designs in animation.

The expression "continuous display surface" is to be taken as "continuous" in the visual sense.

The term "edge areas" as used in the specification and claims is to be understood as having reference to the portions of the main surfaces of the plates contiguous to the plate edges.

In the use of the term "along a plane," and the like, I describe the positioning of the plates, relative to each other, with respect to a reference plane coextensive with each plate. As the plates are not themselves necessarily flat, exemplified by the curvature of the plates of the first-described species of the invention, the "plane" referred to is to be understood as a reference plane which comes closest to the major surfaces of the plate.

Having thus described my invention, what I claim is:

1. A display device including a plurality of plates of sheet material of general similarity in size and shape supported by driving means along closely spaced parallel planes in a staggered stack order in which a like positioned edge area of each of said plates is exposed to view from at least one side of said stack to present, in the aggregate, a continuous display surface with the remaining surface of each of said plates, excepting the first plate of the stack, being concealed from view by the next forward plate, said driving means being adapted to simultaneously rotate all of said plates, each along its own plane, in such manner that the said plate edge areas which are thus exposed to view in one stage of the operation of said device are traversed out of sight into the stack while another set of plate edge areas is traversed from within the stack into view to aggregate in another continuous display surface, the edge areas of said plates bearing markings so inscribed that, at each of a plurality of points of rotation, certain of said markings come into registration with each other to represent a graphic display showing, and motive means to impart motion to said driving means to rotate said plates through a succession of such points of rotation whereby to exhibit such display showings.

2. A display device as set forth in claim 1 in which said motive means is adapted to drive said device in intermittent motion with a pause at each such point of rotation where said markings register to represent a display showing.

3. A display device including a plurality of plates of sheet material of general similarity in size and shape supported by driving means along closely spaced parallel planes in a staggered stack order in which, as seen from each side of the stack, a like positioned edge area of each of said plates is exposed to view to present, in the aggregate, a continuous display surface with the remaining surface of each of said plates, excepting the first plate to view, being concealed by the next forward plate, said driving means being adapted to simultaneously rotate all of said plates, each along its own plane, in such manner that the said plate edge areas which are thus exposed to view in one stage of the operation of said device are traversed out of sight into the stack while another set of plate edge areas is traversed from within the stack into view to aggregate in another pair of continuous display surfaces, the edge areas of both sides of said plates bearing markings so inscribed that, at each of a plurality of points of rotation, certain of said markings come into registration with each other to represent to observers from each direction of view, a graphic display showing, and motive means to impart motion to said driving means to rotate said plates through a succession of such points of rotation whereby to exhibit such display showings.

4. A display device as set forth in claim 3 in which said motive means is adapted to drive said device in intermittent motion with a pause at each such point of rotation where said markings register to represent display showings.

5. A display device including a plurality of plates of sheet material spaced along a shaft, the axial line of which shaft passes through a similarly located point on each of the plates, said plates being secured to the shaft by flexible means such that each plate may be turned to occupy, at least in part, a position along a plane extending in the general direction of the shaft while being constrained by said connecting means to turning along its respective plane as the shaft is turned, means urging each of said plates to so occupy a position along one of a plurality of planes, closely spaced and parallel to each other and extending in the general direction of the shaft, whereby to present to view, in at least one direction lateral of the shaft, the appearance of a staggered stack of plates in which a like positioned edge area of each of said plates is exposed to present, in the aggregate, a continuous display surface with the remaining surface of each of said plates, excepting the first plate in the stack, being concealed from view by the next forward plate, which plate edge areas are, upon rotation of the shaft, thus traversed out of sight into the stack to be replaced by another set of plate edge areas which aggregate in another continuous display surface, the edge areas of said plates bearing markings so inscribed that, at each of a plurality of points of rotation, certain of said markings come into registration with each other to represent a graphic display showing, and motive means to impart motion to said shaft to thereby rotate said plates through a succession of such points of rotation whereby to exhibit such display showings.

6. A display device as set forth in claim 5 in which said motive means is adapted to drive said shaft in intermittent motion with a pause at each such point of rotation where said markings register to represent a display showing.

7. A display device including a plurality of plates of sheet material spaced along a shaft, the axial line of which shaft passes through a similarly located point on each of said plates, said plates being secured to the shaft by flexible means such that each plate may be turned to occupy a position along a plane extending in the general direction of the shaft while being constrained by said connecting means to turning along its respective plane as the shaft is turned, means urging each of said plates to so occupy a position along one of a plurality of planes, closely spaced and parallel to each other and extending in the general direction of the shaft, whereby to present the appearance of a staggered stack of plates to view in each of two opposite directions lateral of the shaft, in which stack, as seen from each direction of view, a like positioned edge area of each of the plates is exposed to present, in the aggregate, a continuous display surface with the remaining surface of each of said plates, excepting the first plate in the stack, being concealed from view by the next forward plate, which plate edge areas are, upon rotation of the shaft, thus traversed out of sight into the stack to be replaced by another set of plate edge areas which aggregate in another continuous display surface, the edge areas of both sides of said plates bearing markings so inscribed that, at each of a plurality of points of rotation, certain of said markings come into registration with each other to represent to observers from each direction of view a graphic display showing, and motive means to impart motion to said shaft to thereby rotate said plates through a succession of such points of rotation whereby to exhibit such display showings.

8. A display device as set forth in claim 7 in which said motive means is adapted to drive said shaft in intermittent motion with a pause at each such point of rotation where said markings register to represent display showings.

9. A display device including a plurality of plates of similar size and shape supported by driving means along closely spaced parallel planes in a staggered stack order in which a like positioned edge area of each of said plates is exposed to view from at least one side of said stack to present, in the aggregate, a continuous display surface with the remaining surface of each of said plates, excepting the first plate of the stack, being concealed from view by the next forward plate, said driving means consisting of a plurality of connecting members, each extending the length of the stack and making connection to each of the plates at the same relative position near the edges thereof, said connecting members being adapted to maintain the plates in constant relative spacing with respect to each other and to turn freely relative to perpendiculars to the plates at the connection points, said plates and connecting members thus comprising an assemblage in which all of the plates are constrained to simultaneous rotation, each along its respective plane, upon the rotation of any one plate around a point of rotation contained within the connection points thereon, whereby upon such rotation of said plates, the plate edge areas which are thus exposed to view in one stage of the operation of said device are traversed out of sight into the stack while another set of plate edge areas is traversed from within the stack into view to aggregate in another continuous display surface, the edge areas of said plates bearing markings so inscribed that, at each of a plurality of points of rotation, certain of said markings come into registration with each other to represent a graphic display showing, means to support said assemblage of plates and connecting members, and motive means to rotate the plates of the assemblage by rotating at least one of the plates whereby to exhibit such display showings.

10. A display device as set forth in claim 9 in which said motive means is adapted to drive said device in intermittent motion with a pause at each such point of rotation where said markings register to represent a display showing.

11. A display device including a plurality of plates of similar size and shape supported by driving means along closely spaced parallel planes in a staggered stack order in which a like positioned edge area of each of said plates is exposed to view from each side of the stack to present, in the aggregate, a continuous display surface with the remaining surface of each of the plates, excepting the first plate of the stack, being concealed from view by the next forward plate, said driving means consisting of a plurality of connecting members, each extending the length of the stack and making connection to each of the plates at the same relative position near the edges thereof, said connecting members being adapted to maintain the plates in constant relative spacing with respect to each other and to turn freely relative to perpendiculars to the plates at the connection points, said plates and connecting members thus comprising an assemblage in which all of the plates are constrained to simultaneous rotation, each along its respective plane, upon rotation of any one plate around a point of rotation contained within the connection points thereon, whereby upon such rotation of said plates, the plate edge areas which are thus exposed to view in one stage of the operation of said device are traversed out of sight into the stack while another set of plate edge areas is traversed from within the stack into view to aggregate in another pair of continuous display surfaces, the edge areas of both sides of said plates bearing markings so inscribed that, at each of a plurality of points of rotation, certain of said markings come into registration with each other to represent from each direction of view, a graphic display showing, means to support said assemblage of plates and connecting members, and means to rotate the plates of the assemblage by rotating at least one of the plates whereby to exhibit such display showings.

12. A display device as set forth in claim 11 in which said motive means is adapted to drive said device in intermittent motion with a pause at each such point of rotation where said markings register to represent display showings.

13. A display device including a plurality of plates of similar size and shape supported by driving means along closely spaced parallel planes in a staggered stack order in which a like positioned edge area of each of said plates is exposed to view from at least one side of said stack to present, in the aggregate, a continuous display surface with the remaining surface of each of said plates, excepting the first plate of the stack, being concealed from view by the next forward plate, said driving means consisting of a plurality of connecting members, each extending the length of the stack through a like located connection point on each of the plates, which connection points are spaced from the plate edges by such distances that said connecting members are concealed from view from in front of the device at all times by the plates, said connecting members being adapted to maintain the plates in constant relative spacing with respect to each other and to turn freely relative to perpendiculars to the plates at the connection points, said plates and connecting members thus comprising an assemblage in which all of the plates are constrained to simultaneous rotation, each along its respective plane, upon rotation of any one plate around a point of rotation contained within the plate area, whereby upon such rotation of said plates, the plate edge areas which are thus exposed to view in one stage in the operation of said device are traversed out of sight into the stack while another set of plate edge areas is traversed from within the stack into view to aggregate in another continuous display surface, the edge areas of said plates bearing markings so inscribed that, at each of a plurality of points of rotation, certain of said markings come into registration with each other to represent a graphic display showing, means to support said assemblage of plates and connecting members, and motive means to rotate the plates of the assemblage by rotating at least one of the plates whereby to exhibit such display showings.

14. A display device as set forth in claim 13 in which said motive means is adapted to drive said device in intermittent motion with a pause at each such point of rotation where said markings register to represent a display showing.

15. A display device including a plurality of plates of similar size and shape supported by driving means along closely spaced parallel planes in a staggered stack order in which a like positioned edge area of each of said plates is exposed to view from each side of the stack to present, in the aggregate, a continuous display surface with the remaining surface of each of the plates, excepting the first plate of the stack, being concealed from view by the next forward plate, said driving means consisting of a plurality of connecting members, each extending the length of the stack through a like located connection point on each of the plates, which connection points are spaced from the plate edges by such distances that said connecting members are concealed from view from in front of each side of the stack at all times by the plates, said connecting members being adapted to maintain the plates in constant relative spacing with respect to each other and to turn freely relative to perpendiculars to the plates at the connection points, said plates and connecting members thus comprising an assemblage in which all of the plates are constrained to simultaneous rotation, each along its respective plane, upon rotation of any one plate around a point of rotation contained within the plate area, whereby upon such rotation of said plates, the plate edge areas which are thus exposed to view in one stage in the operation of said device are traversed out of sight into the stack while another set of plate edge areas is traversed from within the stack into view to aggregate in another pair of continuous display surfaces, the edge areas of said plates bearing markings so inscribed that, at each of a plurality of points of rotation, certain of said markings come into registration with each other to represent from each direction of view, a graphic display showing, means to support said assemblage of plates and connecting members, and motive means to rotate the plates of the assemblage by rotating at least one of the plates whereby to exhibit such display showings.

16. A display device as set forth in claim 15 in which said motive means is adapted to drive said device in intermittent motion with a pause at each such point of rotation where said markings register to represent display showings.

References Cited in the file of this patent

UNITED STATES PATENTS

| | | |
|---|---|---|
| 729,599 | Jolly | June 2, 1903 |
| 1,019,770 | Doner | Mar. 12, 1912 |
| 2,624,142 | Sayre | Jan. 6, 1953 |